United States Patent [19]

Gilberts

[11] Patent Number: 5,390,425
[45] Date of Patent: Feb. 21, 1995

[54] SAW GUIDE MEASURING SQUARE

[76] Inventor: Alexander Gilberts, 10265 Church St., Barrington Hills, Ill. 60010

[21] Appl. No.: 127,762

[22] Filed: Sep. 28, 1993

Related U.S. Application Data

[63] Continuation-in-part of Ser. No. 823,820, Jan. 22, 1992, abandoned.

[51] Int. Cl.⁶ .......................... B43L 13/02; G01B 3/10
[52] U.S. Cl. .......................... 33/764; 33/760; 33/768; 33/770; 33/474; 83/745
[58] Field of Search ................. 33/452, 465, 471, 474, 33/484, 485, 489, 755, 759, 760, 761, 764, 768, 770, 628, 630, 640; 83/745

[56] References Cited

U.S. PATENT DOCUMENTS

| | | | |
|---|---|---|---|
| 259,556 | 6/1882 | Kulman | 33/760 X |
| 1,535,042 | 4/1925 | Sadler | |
| 2,065,143 | 12/1936 | Metcalf | 33/760 X |
| 2,396,877 | 3/1946 | Peterson | 33/770 |
| 2,581,858 | 1/1952 | Hilt et al. | 33/768 X |
| 2,708,465 | 5/1955 | Huebner et al. | |
| 2,719,548 | 10/1955 | Mitchell | |
| 2,735,455 | 2/1956 | Forsberg | |
| 2,773,523 | 12/1956 | Hopla | |
| 2,818,892 | 1/1958 | Price | |
| 2,823,709 | 2/1958 | Konieczka | |
| 2,976,899 | 3/1961 | Lane | |
| 3,324,560 | 6/1967 | Snyder | 33/768 |
| 3,390,461 | 7/1968 | Anderson | |
| 3,903,774 | 9/1975 | Stinson | |
| 4,056,028 | 11/1977 | Patterson | |
| 4,062,390 | 12/1977 | Beekenkamp | |
| 4,128,030 | 9/1978 | Kundikoff | |
| 4,227,314 | 10/1980 | Schliep | 33/484 X |
| 4,335,512 | 1/1982 | Sheps et al. | |
| 4,402,233 | 5/1980 | Larson | |
| 4,483,071 | 11/1984 | te Kolste | |
| 4,524,662 | 6/1985 | Carley | |
| 4,603,481 | 8/1986 | Cohen et al. | |
| 4,638,564 | 1/1987 | Burrows | |
| 4,642,898 | 2/1987 | Miller | |
| 4,790,072 | 9/1988 | Edwards | |
| 4,843,728 | 7/1989 | Francis | |
| 4,901,444 | 2/1990 | Maschmeier | |
| 4,961,360 | 10/1990 | Peel et al. | |
| 5,035,061 | 7/1991 | Bradbury et al. | |
| 5,038,486 | 8/1991 | Ducate, Sr. | |

FOREIGN PATENT DOCUMENTS 991887 5/1965 United Kingdom ................. 33/761

Primary Examiner—Alvin Wirthlin
Attorney, Agent, or Firm—Trexler, Bushnell, Giangiorgi & Blackstone, Ltd.

[57] ABSTRACT

A tool guiding measuring apparatus or apparatus for measuring a portion of a workpiece and guiding a tool during an operation on the workpiece. The apparatus includes an aligning body portion for positioning the apparatus in a desired orientation against a workpiece. Two tapes are provided on the aligning body portion for measuring the dimension of a portion of the workpiece. A selectively positionable clamp on a free end of the tape is used to calibrate the apparatus to provide a true measure on the tape of the dimension of the workpiece while compensating for the dimensions of the apparatus and tool. The selectively positionable clamp securely attaches to each of the tapes at a desired calibration position on the respective tape to provide ease of use and repeatable measuring. The apparatus also includes a clamping device which clamps the apparatus to the workpiece to prevent movement of the apparatus while cutting.

7 Claims, 3 Drawing Sheets

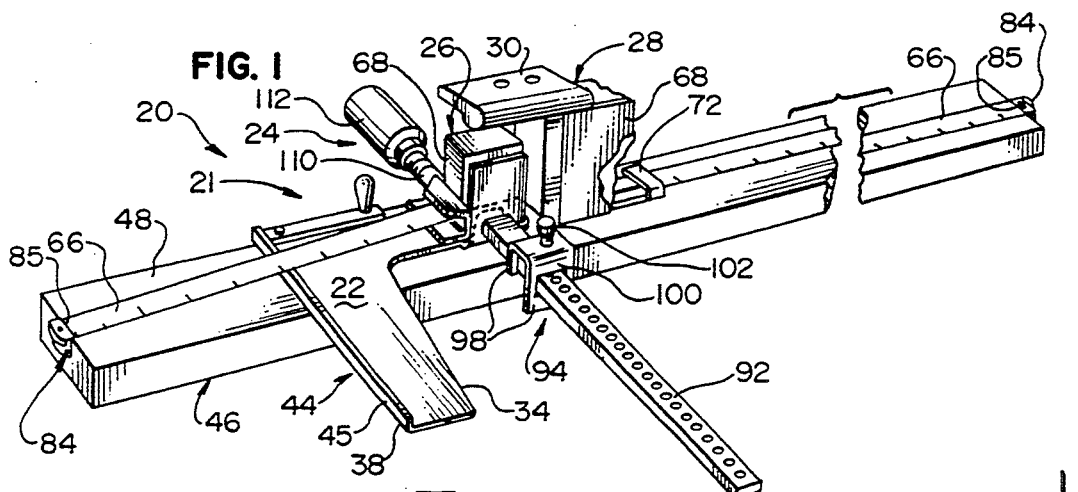
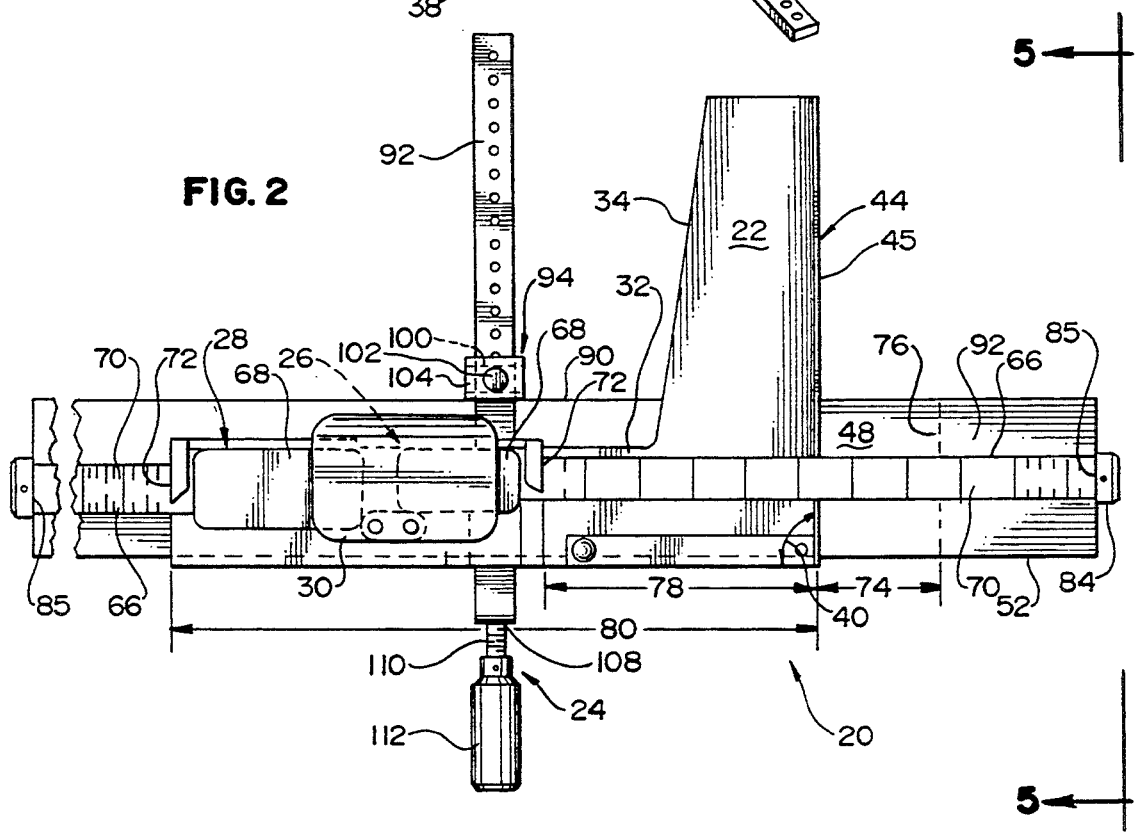

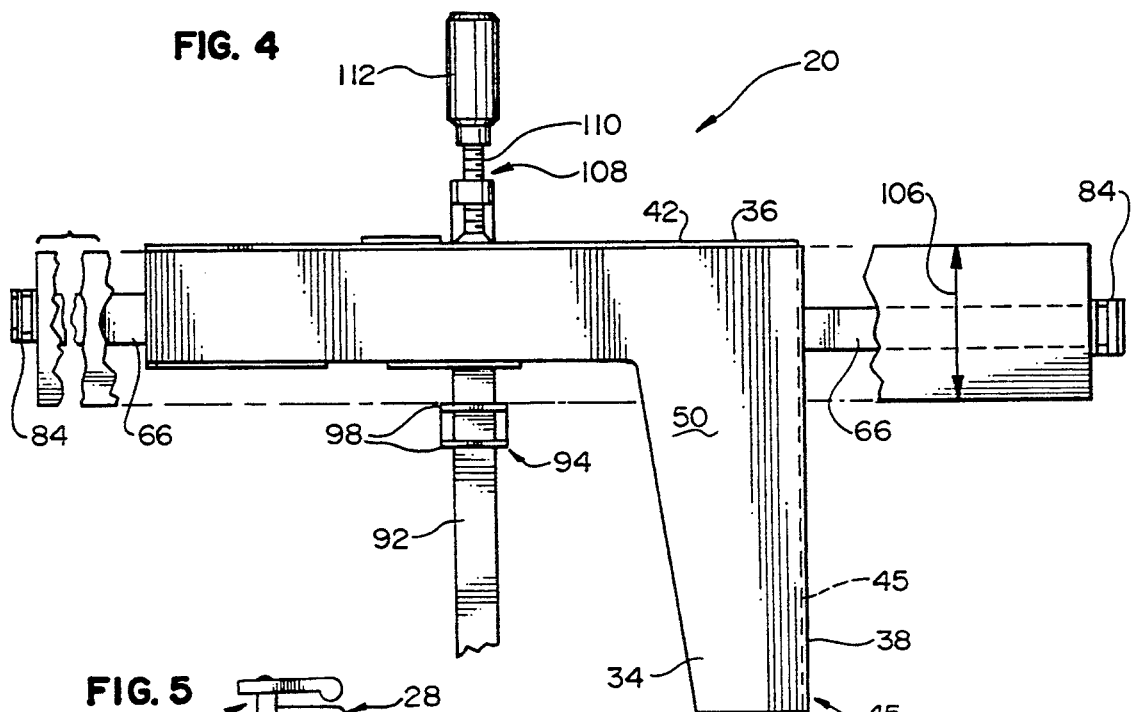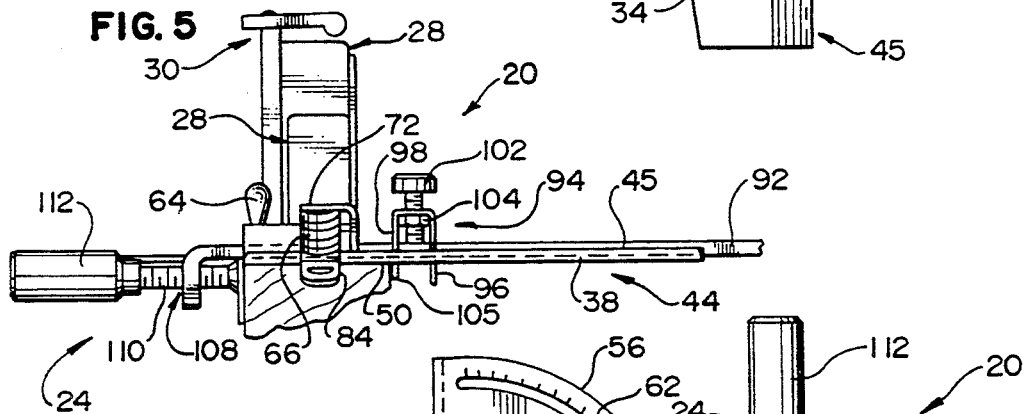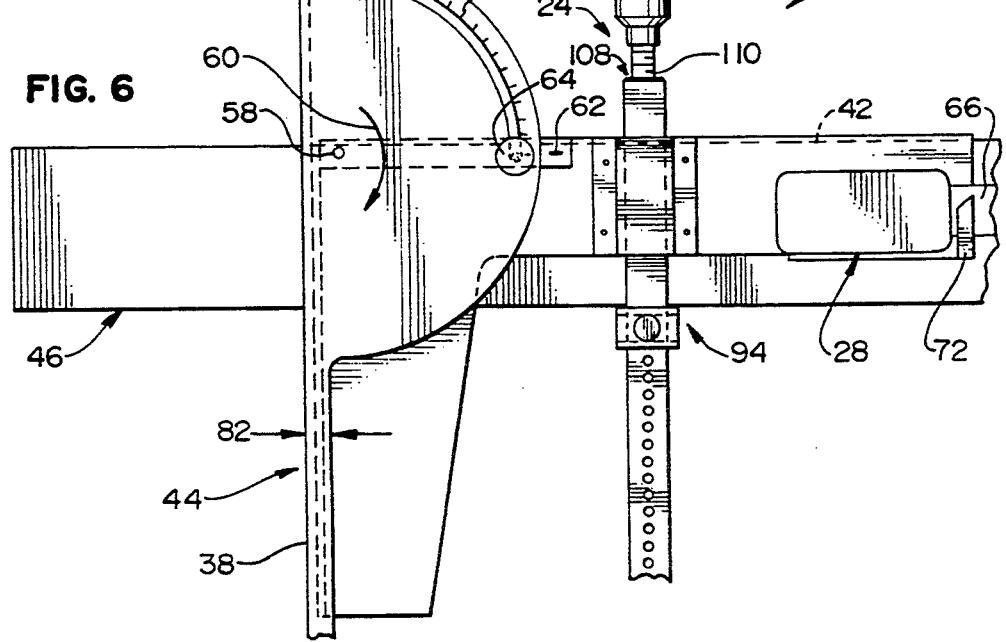

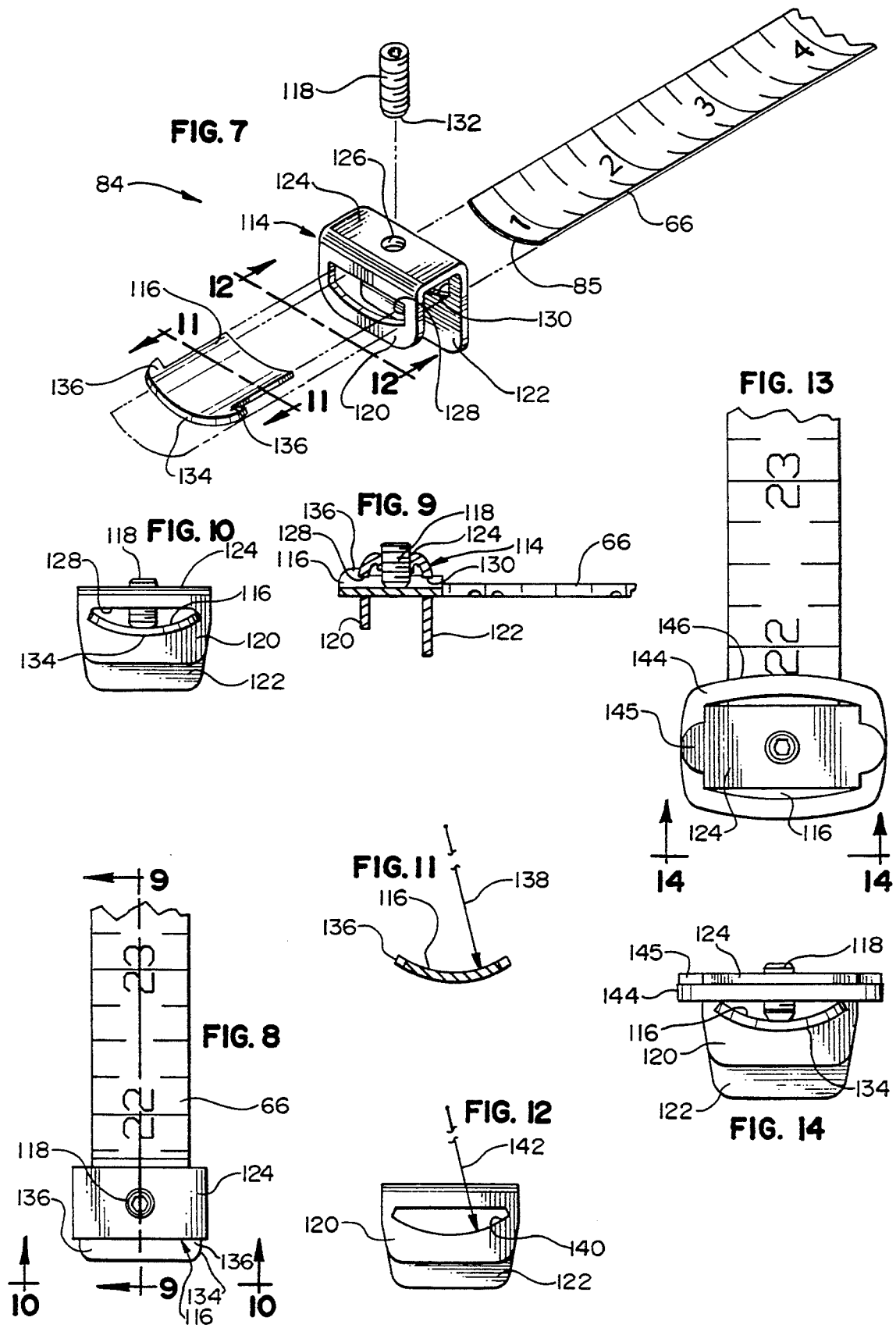

SAW GUIDE MEASURING SQUARE

CROSS REFERENCE TO RELATED APPLICATION

This is a continuation-in-part of U.S. patent application Ser. No. 07/823,820, filed Jan. 22, 1992, now abandoned.

BACKGROUND OF THE INVENTION

The present invention generally relates to an apparatus for guiding a tool during an operation on a workpiece. A general example of the type of apparatus discussed hereinbelow is a saw guiding device used to position a saw on a piece of lumber during a sawing operation. More particularly, the present invention pertains to apparatus which measure, position, and guide a tool in relation to a workpiece to increase the accuracy, reliability and ease of use of the tool when performing an operation on a workpiece.

A number of references, listed hereinbelow, show apparatus which provide a guiding square, or a guiding square with some form of measuring device, or a guiding square with some form of protractor.

Guide Squares

U.S. Pat. No. 5,035,061 to Bradbury, et al., Issued Jul. 30, 1991;

U.S. Pat. No. 3,903,774 to Stinson, Issued Sep. 9, 1975; and

U.S. Pat. No. 2,708,465 to Huebner, et al., Issued May 17, 1955.

Guide Squares with Measuring Devices

U.S. Pat. No. 4,638,564 to Burrows, Issued Jan. 27, 1987;

U.S. Pat. No. 4,483,071 to te Kolste, Issued Nov. 20, 1984; and

U.S. Pat. No. 4,128,030 to Kundikoff, Issued Sep. 5, 1978,

U.S. Pat. No. 2,818,892 to Price, Issued Jan. 7, 1958,

U.S. Pat. No. 1,535,042 to Sadler, Issued Apr. 21, 1925.

Guide Squares with Protractors

U.S. Pat. No. 5,038,486 to Ducate, Sr., Issued Aug. 13, 1991,

U.S. Pat. No. 4,790,072 to Edwards, Issued Sep. 13, 1988,

U.S. Pat. No. 4,335,512 to Seeps, et al, Jan. 22, 1982,

U.S. Pat. No. 4,402,233 to Larson, Issued May 13, 1980,

U.S. Pat. No. 4,062,390 to Beekenkamp, Issued Dec. 13, 1977,

U.S. Pat. No. 4,056,028 to Patterson, Issued Nov. 1, 1977,

U.S. Pat. No. 2,735,455 to Forsberg, Issued Feb. 21, 1956.

Comparison of the above-listed references to the disclosed invention will reveal that a tool guiding measuring apparatus of the present invention has not been previously disclosed. A cutting operation using a saw to cut a wooden workpiece will be used to illustrate the problems and other shortcomings of the apparatus in the above-listed references.

When a workpiece such as a plank or 2×4 must be cut to a particular length, it is necessary to measure the length of the piece to be cut, calculate or otherwise determine the length of the workpiece, and then cut the workpiece. When cutting the workpiece, it is advantageous to provide a guiding device to guide the saw through the workpiece during the cutting operation so that the cut edge is straight. Additionally, a guide helps to reduce inaccuracies or errors that would otherwise result if the saw inadvertently moved or bumped during the cutting operation without such a guide.

When only a couple of workpieces must be cut, a separate T-square, measuring device, and protractor are commonly used to determine the dimension of the cut line. The position of the cut line is measured and marked, the T-square and the pencil are used to trace a straight cut line on the workpiece, and then a saw is carefully guided along the marked cut line. However, as noted above, failure to use a guide device may result in inaccuracies or errors in cutting the marked line. Therefore, even when cutting only a couple of workpieces it would be useful to provide a device to combine or eliminate various steps of the calculating and marking operation.

The advantages of combining or eliminating one or more steps in an operation on a workpiece are more apparent when numerous workpieces must be cut to a common length or at a common angle. For example, building construction practices for residential, commercial and industrial structures commonly involve production-type building operations in which many components of the structures are produced in an assembly line manner. In such an application, it would be advantageous to provide a device which may be used to measure a predetermined dimension and position a guiding device at a predetermined angle relative to the workpiece which can then be secured at the desired position during the cutting operation.

Additionally, a number of the above-listed references require special attachments to be attached to a specific tool or are not movable such that they are fixed to a larger apparatus such as a table saw platform. It would be advantageous to provide a device which could be removed and attached to numerous workpieces and which would be generic and calibratable to anyone of a number of tools. Such characteristics are desirable since at a work site it is important to be able to fit the tool to the workpiece. In other words, it would be desirable to position a guiding apparatus and a tool on a workpiece instead of having to position a workpiece on a tool due to the size and/or dimensions of the workpiece. Further, it is desirable to have a device which is generic to any of a number of tools so that a variety of users may use the device regardless of the type of tool they have or use with the guiding device.

Several references were cited by the Examiner in the parent case, U.S. Pat. No. 3,390,461 to Anderson, U.S. Pat. No. 2,823,709 to Konieczka, U.S. Pat. No. 4,524,662 to Carley and U.S. Pat. No. 4,603,481 to Cohen et al. The Anderson, Konieczka, and Carley devices show some kind of cutting guide for use with saws. Cohen et al. merely shows a bumper which is attachable to a recoilable tape. The saw guide devices as shown in Anderson, Konieczka and Carley all require several calculations to be made in order to position the guide at a desired cutting location. First, the desired cut piece measurement must be measured along the workpiece and a mark made on the workpiece. Next, compensation must be provided for the position of the cutting blade of the saw. In other words, a measurement must be made from the cut line in order to compensate for the dimensional difference between the portion of the tool which abuts the saw guide and the position of the blade relative to the saw guide. Then, the guide must be positioned on the second mark and the saw positioned to check the alignment of the blade with the desire to cut line. As should be evident from the above description, these calculations would become quite tedious and introduce errors in the cutting process when numerous pieces having generally the same dimension must be cut.

With regard to the Cohen et al. device, the bumper as shown therein has a structure which functions to allow a degree of movement along the tape to reposition the bumper at a desired location. The bumper can not be securely attached to the tape otherwise the bumper would not be able to function in the desired disclosed manner.

OBJECTS AND SUMMARY OF THE INVENTION

A general object of the present invention is to provide a tool guiding measuring apparatus which quickly and repeatably measures a desired length along a workpiece and retains a tool guiding portion in a desired location during an operation on the workpiece.

Another general object of the present invention is to eliminate the need for a separate squaring tool, protractor device, measuring device, and tool guide.

A further object of the present invention is to eliminate the potential for errors and inaccuracies which are inherent when using a separate squaring tool, protractor device, measuring device, tool guide, and a marked cutting line.

Still another object of the present invention is to provide a tool guiding measuring apparatus which employs a retractable tape measure having an adjustable calibrating clamp attached thereto which calibrating clamp can be positioned to calibrate the indicia on the tape measure to provide a true measure of the piece being cut while compensating for the dimensions of the apparatus and the position of the tool used to cut the workpiece.

Another object of the present invention is to provide the necessary measuring, guiding, and holding components in one device thereby eliminating the need for multiple tools in measuring a cutting position and guiding a tool during a cutting operation.

Still another object of the present invention is to provide a tool guiding measuring apparatus which promotes faster and more accurate repetitive operations on a workpiece.

Briefly, and in accordance with the foregoing, the present invention comprises a tool guiding measuring apparatus or apparatus for measuring a portion of a workpiece and guiding a tool during an operation on the workpiece. The apparatus includes an aligning body portion for positioning the apparatus in a desired orientation against a workpiece. The aligning body portion has a top side and a bottom side and is generally planar with a first and second edge between the top and bottom sides having an angle formed there between. The bottom side of the aligning body abuts a first side of the workpiece and a positioning portion extending downwardly from the first side abuts a second side of the workpiece. A tool positioning portion extends upwardly from the second edge for guiding a tool during an operation on the workpiece. At least one tape measure is provided on the apparatus for measuring the dimension of a portion of the workpiece. A selectively positionable calibrating clamp on a free end of the tape is used to calibrate the apparatus to provide a true measure on the tape of the dimension of the workpiece while compensating for the dimensions of the apparatus and tool. In other words, the measurement read on the tape is the position at which the operation, such as cutting by a saw occurs on the workpiece. Measurement using the calibrated tape eliminates the need to make mathematical calculations to compensate for the dimensions of the apparatus and tool. The adjustable calibrating clamp securely attaches to the tape at a desired calibration position to provide ease of use and repeatable measuring. The apparatus also includes a clamping device which clamps the apparatus to the workpiece to prevent movement of the apparatus while cutting.

BRIEF DESCRIPTION OF THE DRAWINGS

The organization and manner of the structure and operation of the invention, together with further objects and advantages thereof, may be understood by reference to the following description taken in connection with the accompanying drawings, wherein like reference numerals identify like elements, and in which:

FIG. 1 is a front perspective view of the saw guiding measuring apparatus of the present invention;

FIG. 2 is a top plan view of the saw guiding measuring apparatus as shown in FIG. 1;

FIG. 3 is a rear elevational view of the saw guiding measuring apparatus;

FIG. 4 is a bottom plan view of the saw guiding measuring apparatus as shown in FIG. 1 with a portion of a workpiece shown in phantom line;

FIG. 5 is a right side elevational view of the saw guiding measuring apparatus taken along line 5—5 in FIG. 2;

FIG. 6 is a top plan view of the saw guiding measuring apparatus to which a protractor device is attached;

FIG. 7 is an enlarged exploded perspective view of an adjustable calibrating clamp shown in FIGS. 1–5 which is associated with the tape of a tape measure used with the apparatus;

FIG. 8 is an enlarged top plan view of the adjustable calibrating clamp attached to the tape, and which tape has been cut after calibration;

FIG. 9 is a partial fragmentary cross-sectional side elevational view taken along line 9—9 in FIG. 8 of the adjustable calibrating clamp and tape;

FIG. 10 is a front elevational view taken along line 10—10 in FIG. 8;

FIG. 11 is a cross sectional view taken along line 11—11 in FIG. 7 showing the radius of the clamp plate;

FIG. 12 is a front elevational view taken along line 12—12 in FIG. 7 showing a front elevation of a clamp base and the radius of an aperture formed in the clamp base;

FIG. 13 is an enlarged top plan view of the adjustable calibrating clamp attached to the tape, which includes a bumper retained on the tape by the clamp and which tape has been cut after calibration; and FIG. 14 is a front elevational view taken along line 14—14 in FIG. 13 showing the bumper.

DETAILED DESCRIPTION OF THE ILLUSTRATED EMBODIMENT

While the invention may be susceptible to embodiment in different forms, there is shown in the drawings, and herein will be described in detail, a specific embodiment with the understanding that the present disclosure is to be considered an exemplification of the principles of the invention and is not intended to limit the invention to that as illustrated and described herein.

Referring now to the drawings, wherein like parts are designated by the same reference numerals throughout the FIGURES, a tool guiding measuring apparatus 20 in accordance with the present invention is shown in FIG. 1. The tool guiding measuring apparatus 20 includes an aligning body 21, retaining means 24, a first and second measuring devices 26, 28 and a handle 30. Each of these components are illustrated in greater detail in accompanying FIGS. 1–6 and are described in further detail hereinbelow.

The aligning body 21 includes a planar plate portion 22 which is generally "L" shaped having a base portion 32 and an extending arm portion 34. Various components of the present invention are attached, either directly or indirectly, to the aligning body 21 thereby consolidating all the features, and the attendant advantages thereof, in a single apparatus. The present invention provides the important and significant advantage of allowing a user to place the apparatus 20 on a workpiece 46 and directly measure the length of a portion of the workpiece to be cut by viewing the indicia on a tape 66 by directly reading a corresponding pointer 72. The present invention compensates for the dimensions of the cutting tool as well as the dimensions between the pointer and a guiding edge of the apparatus.

With further reference to FIGS. 2–5, the aligning body 21 has a first edge 36 and a second edge 38 (FIG. 4) which are formed at an angle 40 (FIG. 2) relative to each other. Positioning means 42 and guiding means 44 (FIG. 3) extend from the first and second edges 36, 38 (FIG. 4) respectively. As more clearly shown in FIGS. 2 and 3, the positioning means 42 is a flange member which extends downwardly from the base portion 32 of the aligning body 21. Similarly, the guiding means 44, as shown in FIGS. 3 and 5, is a flange portion which extends upwardly away from the arm portion 34.

Placement of the saw guiding measuring apparatus 20 on a workpiece 46 in the manner as shown in FIG. 1 orients the apparatus 20 relative to a first side 48 of the workpiece 46. A bottom surface 50 of the planar plate portion 22 of the aligning body 21 abuts the first side 48 of the workpiece 46. The apparatus 20 is positioned with respect to a second side 52 (FIG. 2) of the workpiece 46 by moving the positioning flange 42 (FIG. 3) into an abutting position against the second side 52. With the planar plate portion 22 and the positioning flange 42 abutting the first and second sides 48, 52, respectively, the guiding flange 44 is positioned for guiding a tool placed thereagainst while performing an operation on the workpiece 46.

It should be noted, that reference to "tool guiding" and "operations" on the workpiece are intended to illustrate the numerous applications of the present invention. For instance, the present invention could be used with a router type tool to guide the router in a routing operation on the workpiece. The present invention could also guide a jigsaw or a circular saw. In the interest of clarity, however, further reference will be made to a "cutting" or "sawing" operation and the tool used in such an operation will be a "saw".

While only a guiding flange 45 has been shown in FIGS. 1–5, the guiding means 44 may also include protractor means 56 operatively associated with the aligning body 21 as is shown in FIG. 6. The protractor means 56 includes an angle measuring portion 62 and a guide arm 38 attached thereto. The protractor means 56 attaches to a pivot point 58 on the aligning body 21. Rotation (as indicated by arrow 60) about the pivot point 58 results in altering the angle of the guide arm 38 relative to the positioning flange 42. Measurement of the angle between the guide arm 38 and the positioning flange 42 may be measured by angle measuring indicia 62 provided on the angle measuring portion 56 and the base portion 32. Once a desired angle is established on the angle measuring portion 56 a locking means or knob 64, retainably engagable with the base portion 32 (FIG. 2) of the aligning body 21 (FIG. 1) is tightened to secure the protractor 56 relative to the planar plate 22 for retaining the desired angle and thus preventing misadjustment during a cutting operation.

Thus far, only the squaring and guiding features of the present invention have been described. The present invention, however, also includes measuring and clamping features which may be employed once the apparatus is positioned relative to the workpiece.

In using the present apparatus, the aligning body 21 is placed on the workpiece 46 and, due to the planar design of the aligning body 21, may be moved along the first side 48 of the workpiece 46. In this regard, once the aligning body 21 is placed against the first side 48 of the workpiece 46, the first or second measuring device 26, 28 may be employed to measure a desired dimension along the workpiece 46.

The first and second measuring devices 26, 28 as shown in FIGS. 1–6 are retractable tape measures. These tape measures have recoilable tape portions 66 which are extendable from and recoilable back into a body portion 68. While retractable tape measures are shown in the illustrated embodiment in the present invention, other forms of measuring devices may be employed with the present invention. Regardless of the type of measuring device 26, 28 employed, the goal of the present invention is to provide measuring device 26, 28 which are attached to the apparatus 20 and to permit the measuring devices 26, 28 to be calibratable with regard to the dimensions of the apparatus 20 and a tool used therewith.

As shown in FIG. 2, each of the tapes 66 has measurement indicia 70 marked thereon. A pointer 72 is positioned proximate to the measuring device 26, 28 for indicating a particular dimension measured by the measuring device 26, 28. The dimension which is read along tape measure at the pointer 72 is the dimension at which a saw will perform a cutting operation along the workpiece 46.

The reason that the measurement on the tape 66 indicated at the pointer 72 is the dimension at which the tool will perform an operation is because the tapes 66 are calibratable for the specific tool used with the tool guiding measuring apparatus 20. The calibration is achieved by use of an adjustable calibrating clamp 84. The structure and function of the clamp 84 is described in greater detail hereinbelow.

For example, as show in FIG. 2, with reference to the dimension lines 78 and 80 showing various dimensions of the apparatus, an arbitrary dimension 74 is used for this example to denote the dimension of a portion of a tool positioned between the guiding flange 45 and a cut line 76 (as indicated by the dash line on the workpiece 46). For example, dimension 74 represents the dimension of the deck or platform around a circular saw (not shown) so that the cutting blade of the saw will produce a desired cut along the cutting line 76. Dimensions 78 and 80 represent dimensions as measured between the guiding flange 45 and the pointers 72 corresponding to a respective one of the first or second measuring devices 26, 28. Additionally, if the protractor means 56 is employed, a dimension 82 (see, FIG. 6) represents the additional dimension of the guide arm 59 which must be included when calibrating the first and second measuring devices 26, 28.

FIGS. 7–12 show the adjusting calibrating clamp 84. With reference to FIG. 7, the clamp 84 has been exploded to more clearly show a clamp base 114, a clamp plate 116 and a locking fastener 118. The clamp base 114 has a first leg 120 and a second leg 122 which are spaced apart but joined by a bridge segment 124. The bridge segment 124 has a threaded bore 126 formed therethrough for receiving the locking fastener 118. A first aperture 128 is formed through a surface of the first leg 120 and a second aperture 130 is formed through the second leg 122 with both the first and second, apertures 128,130 being coincident.

When calibrating a tape 66 for a particular tool used with the apparatus 20, the clamp base 114 is positioned over the tape 66 with the tape extending through the first and second apertures 128,130. The clamp plate 116 is inserted through the first and second apertures 128,130 overlying the tape 66 to retain the tape in the clamp base 114. The locking fastener 118 is driven into the threaded bore 126 with a tip portion 132 of the fastener 118 abutting the clamp plate 116. Threaded engagement of the fastener 118 in the bore 126 creates a locking force on the clamp plate 116 to securely retain the clamp base 114 on the tape 116 at the desired calibrated position.

With reference to FIG. 10, a leading edge 134 of the clamp plate 116 extends slightly beyond a free end of the tape 66 to prevent contact with the end of the tape which may be sharp after cutting the tape to the desired calibrated length. Additionally, flanges or wings 136 are provided on each side of the clamp plate 116 to facilitate efficient assembly of the plate through the first and second apertures 128,130 during the calibration operation.

With reference to FIGS. 11 and 12, an end view of the clamp base 114 and clamp plate 116 is shown. The clamp plate 116 has a plate radius 138 as shown by the partial fragmentary arrow. The apertures 128,130 have an arcuate edge 140 forming one portion of the aperture. The arcuate edge has an aperture radius 142 as shown by the fragmentary arrow. The plate radius 138 is greater than aperture radius 142. The apertures 128,130 are sized and dimensioned to accommodate the clamp plate 116. The differences in the dimensions of the radii 138,142 provides full distribution of the clamping force on the tape 66 between radiuses 138 and 142 to more securely retain the tape 66 in engagement with the clamp base 114. Since the clamp plate 116 has a larger radius, when the locking fastener 118 pushes down on the clamping plate 116, the larger radius 138 is forced to conform to the smaller radius 142 thereby providing greater contact forces over the entire arcuate edge 140. The greater contacting forces are created by spring or biasing effect caused by the disparity between the radii 138,142. In contrast, if the radii 138,142 were opposite, the tip 132 may tend to concentrate or centralize the securing forces and therefore not provide the same degree of engagement of the clamp 116 on the tape 66.

As further shown in FIGS. 13 and 14, a bumper 144 is provided to minimize the impact forces when the tape is allowed to retract into a body portion of the corresponding tape measure. The bumper 144 is formed of a resilient rubber or plastic material. The bumper 144 is placed around the clamp base 114 below retaining ears 145 extending from the bridge segment 124. A bulging portion 146 of the bumper 144 provides a degree of cushioning in combination with the resilient characteristics of the material used to form the bumper 144.

Calibration for tape 28 is achieved by placing a line on workpiece 46 at, for example, three feet (3'). Apparatus 20 is now placed on the workpiece 46 with the guiding edge 45 at the distance 74, which represents the particular saw being calibrated, back from the three feet (3') cut line marked on workpiece 46, after which the apparatus 20 is clamped in place. The tape 66 is now extended from the body 28 until the three feet (3') mark on tape 66 is shown at pointer 72. Tape 66 is now locked in place with the standard locking device-supplied on the measuring tape 28. The calibrating clamp 84 is placed onto the tape 66 and moved along the tape until it contacts the end of workpiece 46 at which point it is tightened in place, the tape 66 projecting out the back of the calibrating clamp 84 can be cut off and removed. The tape 28 of apparatus 20 is now calibrated to this particular saw. Measuring device 26 is similarly calibrated except the thickness of the cutting blade must be added to distance 74.

Once the first and second measuring devices 26, 28 are calibrated, a measurement may be read at either pointer 72 indicating the dimension of a corresponding portion of a workpiece 46 relative to the cut line 76. The apparatus 20 eliminates the requirement of making calculating compensations each time a cut is to be made. In other words, all one needs to do is place the apparatus 20 on the workpiece, extend the tape and read the measurement at the pointer. The measurement read at the pointer is the length of the piece being measured so that when the tool is placed against the apparatus to make a cut, the measurement at the cut line 76 is directly read at the pointer 72. Both of the measuring devices 26 and 28 are required on this apparatus 20. The measuring device 28 is required to cut a piece of lumber from approximately two feet in length or longer. Whereas, the measuring device 26 is required to cut a piece of lumber from zero to a maximum of ten feet in length. This apparatus 20 is always clamped to the portion of the workpiece 46 which will remain on a table or saw horses after the cut is complete. It is never clamped to the portion of the workpiece which will fall away after the cut.

With reference to FIG. 2, for illustrative purposes it will be assumed that the portion 90 of the workpiece 46 to the left of the cut line 76 is supported by a work bench or saw horses or some other stable support. Further, the portion 92 of the workpiece 46 to the right hand side of the cut line 76 is intended to fall away from the workpiece 46 after the cut is made. In this example, the apparatus 20 is properly shown attached to the portion 90.

The two measuring devices 26, 28 provide positive measurements of the portion of the workpiece which is to be measured and cut to a specific length. The piece to be cut to a predetermined desired length is actually measured instead of being measured by subtracting the desired length from the total dimension of the workpiece and measuring the resulting dimension. As such, the first measuring device 26 is provided to measure shorter pieces because the longer portion of the workpiece will be retained on the stable support and the second measuring device 28 is used to measure longer portions of the workpiece since it is desirable to have the shorter portion fall away from the workpiece after cutting.

With further reference to FIGS. 4 and 5, the retaining means 24 is used to clamp the apparatus 20 to the workpiece 46 once a desired cutting position and dimension are selected. The measuring apparatus 20 includes a beam member 92 which, as more clearly shown in FIGS. 2 and 4, extends generally perpendicularly to the positioning flange 42. An adjustable backstop member 94 is formed in a U-shape and has two legs 98. Apertures 100 are formed through the legs 98 of the backstop member 94 for receiving the beam member 92 therethrough. An adjustment screw 102 extends through a base 104 which extends between the legs 98. The adjustment screw 102 is threadedly advanced through the base 104 and into a suitable hole in the beam member 92 and tightened. When the adjustment screw 102 is loosened and the screw point is moved out of its recess or hole, the backstop member 94 can slide along the beam member 92. This allows for a rough adjustment of the backstop to suit different size workpieces. When the apparatus 20 is placed on the workpiece 46, the backstop 94 is moved into position to be as close to the workpiece as the nearest hole in the beam member 92 will allow.

When using the retaining means 24 in repetitive operations on workpieces 46 having a common width 106, the backstop member 94 is initially adjusted to a workpiece 46, as described above, retaining the workpiece 46 loosely between the positioning flange 42 and the backstop member 94. Additional tightening and clamping action of the retaining means 24 is provided by a threaded screw assembly 108 which is threadedly engaged with a portion of the beam member 92. The threaded assembly 108 has a threaded rod 110 and a handle 112 on an end of the threaded rod 110 so that a user may rotate the handle 112 which in turn rotates rod 110 to draw the backstop member 94, attached to the beam member 92, tightly against the workpiece 46. The threaded assembly 108 provides quick tightening and disengagement of the retaining means 24 since most of the movement is accomplished by prior adjustment of the backstop member 94.

In use, the apparatus 20 of the present invention is positioned on a workpiece 46 such that the bottom surface 50 abuts a first side 48 of the workpiece 46. Next, the positioning flange 42 is urged into abutment with a second side 52 of the workpiece 46. The measuring devices 26, 28 are calibrated, as described in detail hereinabove, to accommodate a selected tool which will be used on the workpiece 46. One of the calibrated tapes 66 is extended until a desired dimension is indicated at the corresponding pointer 72. In order to retain the apparatus 20 on the workpiece 46 during the cutting operation, the retaining means 24 is roughly adjusted to a loose fit, as described above, between the backstop member 94 and the positioning flange 42. Then, by means of the threaded assembly 108, the tightening force between the positioning flange 42 and the backstop member 94 is increased. After tightening the retaining means 24, the tape 66 is disengaged from the end of the workpiece 46 and recoiled into the body 68 of the corresponding measuring device. With the apparatus 20 as adjusted, positioned, and secured, a tool is guided along the guiding flange 45 to produce the desired cut along the cut line 76.

While a preferred embodiment of the present invention is shown and described, it is envisioned that those skilled in the art may devise various modifications of the present invention without departing from the spirit and scope of the appended claims. The invention is not intended to be limited by the foregoing disclosure.

What is claimed is:

1. A tool guiding measuring apparatus which is calibratable for use with a cutting tool for which said apparatus is calibrated to measure a portion of a workpiece and guide said cutting tool through said workpiece at a desired location measured by said tool guiding measuring apparatus, said workpiece having first and second generally perpendicularly disposed, generally planar sides, said tool guiding measuring apparatus comprising:

an aligning body for orienting said tool guiding measuring apparatus relative to a workpiece and providing a cutting guide for said cutting tool;

a first retractable tape measure attached to said aligning body and extendable in a first direction generally parallel to a direction of elongation of said workpiece for measuring a dimension of said workpiece, measuring indicia disposed on said first tape measure for measuring;

a first pointer member operatively associated with said first tape measure for pointing to indicia on said first tape measure indicating a dimension of said workpiece measured thereby;

an adjustable calibrating clamp associated with said tape measure, said adjustable calibrating clamp being positionable along said tape measure at a location on said tape which calibrates said tape to a cutting tool relative to said aligning body, a clamp base having an aperture formed through a surface thereof sized and dimensioned for receiving said tape therethrough, said aperture having an arcuate edge having a first radius;

a clamp plate defining an arcuate surface positioned in and extending through said aperture and abutting said tape measure coextending through said aperture;

a locking fastener operatively associated with said clamp base and abutting said clamp plate proximate to said aperture for retaining said tape and clamp plate in position in said aperture; and whereby said calibrating clamp is associated with and positioned along said tape measure at a location which calibrates said tape to a cutting tool relative to said aligning body such that the measurement indicated by said pointer on said tape corresponds to a measurement at which said cutting tool is to cut said workpiece when guided along said tool guiding member.

2. A tool guiding measuring apparatus as recited in claim 1, further comprising:

a second retractable tape measure attached to said aligning body and extendable in a second direction generally parallel to a direction of elongation of said workpiece and 180 degrees from said first direction for measuring a dimension of said workpiece, measuring indicia disposed on said second tape measure for measuring;

a second pointer member operatively associated with said second tape measure for pointing to indicia on said second tape measure indicating a dimension of said workpiece measured thereby; and a second adjustable calibrating clamp associated with said second tape measure, said second adjustable calibrating clamp being positionable along said second tape measure at a location on said second tape which calibrates said second tape to a cutting tool relatively to said aligning body, said second calibration clamp including a clamp base having an aperture formed through a surface thereof sized and dimensioned for receiving said tape therethrough, said aperture having an arcuate edge having a first radius, a clamp plate defining an arcuate surface positioned in and extending through said aperture and abutting said tape measure coextending through said aperture, a locking fastener operatively associated with said clamp base and abutting said clamp plate proximate to said aperture for retaining said tape and clamp plate in position in said aperture, whereby said second calibrating clamp is associated with and positioned along said second tape measure at a location which calibrates said second tape to a cutting tool relative to said aligning body such that the measurement indicated by said second pointer on said second tape corresponds to a measurement at which said cutting tool is to cut said workpiece when guided along said tool guiding member.

3. An adjustable calibrating clamp for use with a tool guiding measuring apparatus of the type having an aligning body for positioning an guiding a cutting tool through a workpiece at a desired location measured by said tool guiding measuring apparatus, said tool guiding measuring apparatus including;

an aligning body for orienting said tool guiding measuring apparatus relative to a workpiece and providing a cutting guide for said cutting tool;

at least one retractable tape measure operatively associated with said aligning body and extendable in a direction generally parallel to a direction of elongation of said workpiece for measuring a dimension of said workpiece, measuring indicia disposed on said tape measure for measuring, a pointer operatively associated with said tape measure for pointing to indicia on said tape measure indicating a dimension of said workpiece measured thereby;

said adjustable calibrating clamp comprising:

a clamp base having an aperture formed through a surface thereof sized and dimensioned for receiving said tape therethrough, said aperture includes an arcuate edge having a first radius, a clamp plate positioned in and extending through said aperture of said clamp base and abutting said tape measure coextending through said aperture, said clamp plate extending beyond an end of said tape, said clamp plate defining an arcuate surface having a second radius, said second radius being greater than said first radius, a locking fastener operatively associated with said clamp base and abutting said clamp plate proximate to said aperture for retaining said tape and clamp plate in position in said aperture;

whereby said calibrating clamp is associated with and positioned along said tape measure at a location which calibrates said tape to a cutting tool relative to said aligning body such that the measurement indicated by said pointer on said tape corresponds to a measurement at which said cutting tool is to cut said workpiece when guided along said aligning body, said locking fastener urging said clamp plate to conform with the smaller radius of said arcuate edge of said aperture for providing a clamping force between said clamp plate and said clamp base.

4. An adjustable calibrating clamp for use with a tool guiding measuring apparatus of the type having an aligning body for positioning and guiding a cutting tool through a workpiece at a desired location measured by said tool guiding measuring apparatus, said tool guiding measuring apparatus including;

an aligning body for orienting said tool guiding measuring apparatus relative to a workpiece and providing a cutting guide for said cutting tool;

at least one retractable tape measure operatively associated with said aligning body and extendable in a direction generally parallel to a direction of elongation of said workpiece for measuring a dimension of said workpiece, measuring indicia disposed on said tape measure for measuring, a pointer operatively associated with said tape measure for pointing to indicia on said tape measure indicating a dimension of said workpiece measured thereby;

said adjustable calibrating clamp comprising:

a clamp base, said clamp base includes first and second spaced apart legs joined by a bridge segment, said first and second legs having coincident first and second apertures formed therein sized and dimensioned for receiving said tape therethrough, a clamp plate positioned in and extending through said apertures of said clamp base and abutting said tape measure coextending through said apertures, said clamp plate extending beyond an end of said tape, a locking fastener operatively associated with said clamp base and abutting said clamp plate proximate to said apertures for retaining said tape and clamp plate in position in said apertures, said locking fastener engagably extending through said bridge segment for engaging said clamp plate at a position between said first and second leg for transferring forces to said clamp plate to securely retain said tape and said clamp plate in engagement in said first and second apertures whereby said calibrating clamp is associated with and positioned along said tape measure at a location which calibrates said tape to a cutting tool relative to said aligning body such that the measurement indicated by said pointer on said tape corresponds to a measurement at which said cutting tool is to cut said workpiece when guided along said aligning body.

5. An adjustable calibrating clamp for use with a tool guiding measuring apparatus of the type having an aligning body for positioning and guiding a cutting tool through a workpiece at a desired location measured by said tool guiding measuring apparatus, said workpiece having first and second generally perpendicularly disposed, generally planar sides, said tool guiding measuring apparatus including:

an aligning body for orienting said tool guiding measuring apparatus relative to a workpiece and providing a cutting guide for said cutting tool;

a planar plate portion of said aligning body positionable against said first side of a workpiece;

a positioning flange projecting generally perpendicularly from said planar plate portion and being positionable against said second side of a workpiece; and an elongated tool guiding member operatively associated with said planar plate portion for overlying said first side of a workpiece, said elongated tool guiding member providing a straight cutting guide for guiding a cutting tool through a workpiece in a straight line;

a first retractable tape measure attached to said planar plate portion and extendable in a first direction generally parallel to said positioning flange for measuring a dimension of said workpiece, measuring indicia disposed on said first tape measure for measuring;

a first pointer member operatively associated with said first tape measure for pointing to indicia on said first tape measure indicating a dimension of said workpiece measured thereby;

a second retractable tape measure attached to said planar plate portion and extendable in a second direction generally parallel to said positioning flange and 180 degrees from said first direction for measuring a dimension of said workpiece, measuring indicia disposed on said second tape measure for measuring;

a second pointer member operatively associated with said second tape measure for pointing to indicia on said second tape measure indicating a dimension of said workpiece measured thereby;

said adjustable calibrating clamp comprising:

a clamp base having an aperture formed through a surface thereof sized and dimensioned for receiving said tape therethrough, said aperture includes an arcuate edge having a first radius, a clamp plate positioned in and extending through said aperture of said clamp base and abutting said tape measure coextending through said aperture, said clamp plate extending beyond an end of said tape, said clamp plate defining an arcuate surface having a second radius, said second radius being greater than said first radius, a locking fastener operatively associated with said clamp base and abutting said clamp plate proximate to said aperture for retaining said tape and clamp plate in position in said aperture; and whereby one each of said calibrating clamps is associated with each of said first and second tape measures and positioned along the corresponding tape measure at a location on said tape which calibrates said tape to a cutting tool relative to said aligning body such that the measurements indicated by said pointers said tapes correspond to a measurement at which said cutting tool is to cut said workpiece when guided along said tool guiding member, said locking fastener urging said clamp plate to conform with the smaller radius of said arcuate edge of said aperture for providing a clamping force between said clamp plate and said clamp base.

6. An adjustable calibrating clamp for use with a tool guiding measuring apparatus of the type having an aligning body for positioning and guiding a cutting tool through a workpiece at a desired location measured by said tool guiding measuring apparatus, said workpiece having first and second generally perpendicularly disposed, generally planar sides, said tool guiding measuring apparatus including:

an aligning body for orienting said tool guiding measuring apparatus relative to a workpiece and providing a cutting guide for said cutting tool;

a planar plate portion of said aligning body positionable against said first side of a workpiece;

a positioning flange projecting generally perpendicularly from said planar plate portion and being positionable against said second side of a workpiece; and an elongated tool guiding member operatively associated with said planar plate portion for overlying said first side of a workpiece, said elongated tool guiding member providing a straight cutting guide for guiding a cutting tool through a workpiece in a straight line;

a first retractable tape measure attached to said planar plate portion and extendable in a first direction generally parallel to said positioning flange for measuring a dimension said workpiece, measuring indicia disposed on said first tape measure for measuring;

a first pointer member operatively associated with said first tape measure for pointing to indicia on said first tape measure indicating a dimension of said workpiece measured thereby;

a second retractable tape measure attached to said planar plate portion and extendable in a second direction generally parallel to said positioning flange and 180 degrees from said first direction for measuring a dimension of said workpiece, measuring indicia disposed on said second tape measure for measuring;

a second pointer member operatively associated with said second tape measure for pointing to indicia on said second tape measure indicating a dimension of said workpiece measured thereby;

said adjustable calibrating clamp comprising:

a clamp base, said clamp base includes first and second spaced apart legs joined by a bridge segment, said first and second legs having coincident first and second apertures formed therein sized and dimensioned for receiving one of said tape measures therethrough, a clamp plate positioned in and extending through each of said apertures of said clamp base and abutting said one tape measure coextending through said apertures, said clamp plate extending beyond an end of said tape, a locking fastener operatively associated with said clamp base and abutting said clamp plate proximate to said apertures for retaining said one tape and clamp plate in position in said aperture; and said locking fastener engagably extending through said bridge segment for engaging said clamp plate at a position between said first and second leg for transferring forces to said clamp plate to securely retain said one tape and said clamp plate in engagement in said first and second apertures whereby one each of said calibrating clamps is associated with each of said first and second tape measures and positioned along the corresponding tape measure at a location on said tape which calibrates said tape to a cutting tool relative to said aligning body such that the measurement indicated by said pointer on said tape corresponds to a measurement at which said cutting tool is to cut said workpiece when guided along said tool guiding member.

7. A tool guiding measuring apparatus which is calibratable for use with a cutting tool for which said apparatus is calibrated to measure a portion of a workpiece and guide said cutting tool through said workpiece at a desired location measured by said tool guiding measuring apparatus, said tool guiding measuring apparatus comprising:

an elongated aligning body for orienting said tool guiding measuring apparatus along a side of a workpiece to be cut;

a tool guiding member operatively associated with said aligning body, said tool guiding member providing a straight cutting guide for guiding a cutting tool through a workpiece in a straight line at a desired measurement;

said tool guiding measuring apparatus comprising two retractable tape measures operatively associated with said aligning body for measuring the location of a cut to be made with said cutting tool positioned against and guided along said tool guiding member, said tape measures being oriented for extension in opposite directions relative to one another along the direction of elongation of said aligning body, each of said tape measures having indicia and a pointer for providing measurement information, a first tape measure of said two tape measures being calibrated relative to said guide member and a cutting tool positioned thereagainst for measuring workpieces to be cut having a length dimensioned of approximately two feet or greater, a second tape measure of said two tape measures being calibrated relative to said guide member and cutting tool positioned thereagainst for measuring workpieces to be cut which have a length dimension from approximately zero feet to approximately ten feet.

* * * * *

UNITED STATES PATENT AND TRADEMARK OFFICE
CERTIFICATE OF CORRECTION

PATENT NO. : 5,390,425
DATED : February 21, 1995
INVENTOR(S) : Alexander Gilberts It is certified that error appears in the above-indentified patent and that said Letters Patent is hereby corrected as shown below:

Column 11, Line 33 "positioning an" should be --positioning and --

Column 14, Line 19 "dimension said" should be --dimension of said --

Signed and Sealed this

Thirteenth Day of June, 1995

Attest:

BRUCE LEHMAN

*Attesting Officer*          *Commissioner of Patents and Trademarks*